United States Patent [19]

Dietz et al.

[11] 4,156,616
[45] May 29, 1979

[54] PIGMENT DISPERSION FOR USE IN HYDROPHILIC AND HYDROPHOBIC MEDIA

[75] Inventors: Erwin Dietz, Kelkheim; Robert Gutbrod; Michael Maikowski, both of Frankfurt am Main, all of Fed. Rep. of Germany

[73] Assignee: Hoechst Aktiengesellschaft, Frankfurt am Main, Fed. Rep. of Germany

[21] Appl. No.: 827,800

[22] Filed: Aug. 25, 1977

[30] Foreign Application Priority Data

Aug. 28, 1976 [DE] Fed. Rep. of Germany ....... 2638946

[51] Int. Cl.$^2$ .............................................. C09C 3/08
[52] U.S. Cl. ............................ 106/308 N; 106/308 Q; 106/304; 106/302; 106/307; 106/293; 106/301
[58] Field of Search ..................... 106/308 N, 308 Q

[56] References Cited

U.S. PATENT DOCUMENTS

| | | | |
|---|---|---|---|
| 3,067,053 | 12/1962 | Tarantino | 106/308 Q |
| 3,094,499 | 6/1963 | Gassmann et al. | 106/308 Q |
| 3,156,574 | 11/1964 | Gomm et al. | 106/308 Q |
| 3,577,255 | 5/1971 | Petke | 106/308 Q |

*Primary Examiner*—Winston A. Douglas
*Assistant Examiner*—J. V. Howard
*Attorney, Agent, or Firm*—Curtis, Morris & Safford

[57] ABSTRACT

Dispersions of inorganic and organic pigments containing an alkylene oxide adduct on long-chain aliphatic amines and an anionic surfactant having an aliphatic radical of 3 to 40 carbon atoms can easily be distributed in hydrophilic and hydrophobic media and yield colorations of high tinctorial strength and purity of shade.

16 Claims, No Drawings

PIGMENT DISPERSION FOR USE IN HYDROPHILIC AND HYDROPHOBIC MEDIA

This invention relates to pigment dispersions suitable for pigmenting hydrophilic as well as hydrophobic media. In addition to the pigments, the dispersions contain alkylene oxide adducts on long chain, preferably primary, amines and anionic surfactants having at least one aliphatic radical with 3 to 40, preferably 6 to 22 carbon atoms. The anionic surfactants can be added in the form of salts or of acids. Especially suitable are monobasic anionic surfactants. Besides the aforesaid constituents, the pigment dispersions may further contain non ionic surfactants, preserving agents, water and/or substances preventing the dispersion from drying up.

The dispersions can contain inorganic and/or organic pigments. Suitable inorganic pigments are, for example, white and colored pigments such as iron oxides, chromium oxides, zinc sulfides, cadmium sulfides, cadmium selenides, titanium dioxide pigments, nickel or chromium titan yellow, chromate pigments, mixed oxides of cobalt and aluminum, furthermore carbon black and extender pigments. Suitable organic pigments are, for example, azo pigments, phthalocyanines, quinacridones; flavanthrones, anthanthrones and pyranthrones; derivatives of perylene tetracarboxylic acid, of naphthalene tetracarboxylic acid, of thionindigo, of dioxazine and of tetrachloroisoindolinone, laked pigments and corresponding pigment mixtures.

Preferred pigment dispersions contain from 3 to 75, preferably 10 to 70% by weight of pigment, 1 to 50, preferably 2 to 20% by weight of alkoxylated, long chain amines and 1 to 50, preferably 2 to 20% by weight of anionic surfactant. They may further contain from 0 to 30% by weight of non ionic surfactants, from 0 to 40% by weight of water, from 0 to 80% by weight, preferably from 10 to 70% by weight, of additives preventing the dispersions from drying up, and from 0 to 1% by weight of preserving agents.

Suitable alkylene oxide addition products on long chain amines are preferably those having aliphatic chains, especially alkyl and alkenyl chains of from 6 to 30 carbon atoms, and ethylene oxide chains composed of 1 to 30 monomer units, for example ethylene oxide adducts on oleyl amine, stearyl amine, tallow fat amine or coconut oil amine.

Preferred anionic surfactants contain $COO^-$, $OSO_3^-$ or $SO_3^-$ as anion-forming groups and correspond especially to the formula

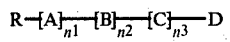

in which
R represents an aliphatic radical having from 3 to 40, preferably 6 to 22 carbon atoms, preferably an alkyl or alkenyl radical which may be substituted by hydroxy and/or carboxy groups;
A represents an aromatic radical, preferably a benzene radical, which may be substituted by one or 2 aliphatic radicals having from 1 to 20 carbon atoms, especially alkyl or alkenyl radicals;
B represents a bivalent group, preferably —O—, —CO—, —SO$_2$—, —NR'— or a combination of such groups, for example —CO—O—, —O—CO—, —CO—NR'—, —NR'—CO—, —SO$_2$—NR'— or —NR'—SO$_2$, in which R' stands for hydrogen or a short chain alkyl radical preferably having from 1 to 4 carbon atoms;
C represents an alkylene group having from 1 to 6 carbon atoms or an alkylene oxide chain, preferably a propylene oxide and more preferably an ethylene oxide chain, of 1 to 30 monomer units;
D represents a preferably monobasic, anion-forming group, preferably —COO$^-$, —SO$_3^-$, or —OSO$_3^-$, and
$n^1$, $n^2$, and $n^3$ are zero or 1.

As anionic surfactants carrying aliphatic radicals preferably having from 6 to 22 carbon atoms there are mentioned, by way of examples, sulfuric acid semiesters of alkoxylated alkyl naphthols and especially of alkyl phenols and of fatty alcohols or alkoxylated fatty alcohols with alkylene oxide chains, preferably ethylene oxide chains, of 1 to 30 monomers units, as well as reaction products of fatty acids or fatty acid derivatives with lower hydroxy-alkane sulfonic acids, aminosulfonic acids and amino acids. Alternatively, the fatty acids can be used per se as well as alkyl or alkylarylsulfonic acids, especially alkylbenzene-sulfonic acids. Especially suitable are, for example, sulfuric acid semiesters of the reaction product of 1 mol of nonyl phenol and 5 mols of ethylene oxide or of the reaction product of 1 mol of coconut oil fatty acid with 15 mols of ethylene oxide or the salts thereof. Further examples are the condensation products of coconut oil fatty acid, tallow oil fatty acid, oleic acid, or stearic acid with hydroxyethane sulfonic acid, taurine, methyltaurine, glycine, or sarcosine and the salts thereof. Oleic acid, ricinoleic acid, naphthenic acids, dodecylsulfonic acid, dodecylbenzene-sulfonic acid and sulfated oleic acid or ricinoleic acid are also suitable. If salts are used, the alkali metal salts and the common ammonium salts are preferred.

From among the non-ionic surfactants, which can be used in addition to the anionic surfactants, especially good results can be obtained, for example, with alkoxylated alkyl phenols, preferably those carrying medium or short alkyl chains, and alkoxylated fatty alcohols, for example the condensation products of 1 mol of nonyl phenol or oleyl alcohol with 5 to 20 mols of ethylene oxide.

As additives which prevent the dispersion from drying up there can be used, inter alia, glycols, for example ethylene glycol, diethylene glycol, triethylene glycol, polyethylene glycols, propylene glycol, dipropylene glycol, polypropylene glycols, hexylene glycol, and also formamide.

The pigment dispersions are prepared in known manner depending on the hardness of the pigment grains used, for example with saw-tooth stirrers (dissolvers), rotor-stator mills, ball mills, sand or bead mills, in kneading machines, or roller mills. Shading (tinting) dyes for aqueous media have been of great importance for quite a while. With growing do-it-yourself tendency, universal or multi-purpose shading pastes, which can be used for pigmenting aqueous systems as well as systems that are immiscible with water, are gaining in importance. When shading pastes of this type are used, it may frequently happen that the pigment, which is finely divided in the paste, flocculates when the paste is stirred into certain media. The flocculated pigment particles may be re-dispersed by more or less vigorous stirring or mechanical agitation, but in some cases such a re-dispersion is impossible or possible only under conditions which exclude the use of the pigments in the do-it-yourself field.

With paints containing such flocculated coloring pigments the full coloring power of the pigments is not utilized. After having spread the paint on the area to be painted, the paint viscosity strongly increases by evaporation and absorption of the liquid in the ground. If the slightly dried and viscous coat of paint is then subjected to shearing forces, for example by brushing over or rubbing with a finger, the flocculated pigment can be de-agglomerated at least partially in these areas. As a result the rubbed area has a more intense color than the adjacent area which has not been rubbed. It is quite obvious that a paint having such detrimental properties is quite useless. A surface coated therewith would have a spotty appearance when the paint is not uniform everywhere, apart from the fact that it is uneconomical not to use the full tinctorial strength of the pigment.

The aforesaid "rub-out-test" is, therefore, a good method to test the quality of multi-purpose shading pigment pastes. However, it should also be taken into consideration how easy a pigment dispersion can be distributed in different media, as a preparation which yields a good rub-out-test after stirring by hand certainly merits a better judgement than another one which must be stirred into the medium by an intensely acting impeller or dissolver (saw tooth stirrer).

The following examples show that the pigment dispersions according to the invention can be readly distributed, even by hand, in the most different media and yield satisfactory rub-out-tests. Even with a high pigment content, the preparations are readley pourable and easy to dose. Moreover, the pigment dispersions according to the invention provide the full coloring strength and brilliancy of the pigments and stabilize them in the pigment dispersions over long storage periods. A further advantage resides in the fact that the claimed pigment dispersions do not detrimentally affect the thixotropy of lacquers produced to have a distinct thixotropy.

To prove the broad compability of the pigment dispersions of the invention there were chosen for test purposes two media each among the great number of hydrophilic and hydrophobic media. This selection is for illustrating purposes only and does not represent any limitation of the general possibilities of application of the pigment dispersions of the invention. All parts and percentages are by weight.

Test Media

A. Dispersion paint on the basis of polyvinyl acetate containing 20 parts of stabilized rutile pigment, 24 parts of extender pigments (preponderantly dolomite), 40 parts of commercial polyvinyl acetate dispersion suitable for dispersion paints (Mowilith® DM2HB) and 0.16 part of methylhydroxyethyl cellulose having an average viscosity of 2 Pas in a 2% aqueous solution at 20° C., the balance of 15.84 parts being water and the usual stabilizers.

B. Dispersion paint on the basis of acrylate resin containing 20 parts of stabilized rutile pigment, 24 parts of extender pigments (preponderantly dolomite), 40 parts of commercial acrylate resin dispersion suitable for dispersion paints (Rhoplex® AC 34) and 0.33 part of methylhydroxyethyl cellulose having an average viscosity of 4 Pas in 2% aqueous solution at 20° C., the balance of 15.67 parts being water and the usual stabilizers.

C. Outdoor paint on the basis of polyvinyl-toluene acrylate containing 15 parts stabilized rutile pigment, 34 parts of extender pigments (preponderantly dolomite), 7 parts of a commercial vinyl-toluene acrylate copolymer suitable for outdoor paintings (Pliolite® VTAC-L) 14 parts of a 10% solution of a modified commercial vinyl-toluene-acrylate copolymer (Pliolite® AC-3) in a mixture of aromatic and aliphatic hydrocarbons, and 30 parts of a mixture of stabilizer, chloroparaffin and white spirit.

D. Air-drying alkyd resin lacquer containing 30 parts of stabilized rutile pigment, 37.5 parts of long-oil alkyd resins on the basis of vegetable fatty acids, 32.5 parts of a mixture of drying substances, stabilizers, white spirit and crystal oil.

For the suitability tests the pigment dispersions specified in the following examples were stirred by hand by means of a glass rod provided with a rubber cap into the various media to be tested. The concentration of the pigment dispersion was chosen in such a manner that in the colored test medium a proportion of white pigment to color pigment of 10:1 was obtained for inorganic color pigments and of 50:1 with organic color pigments and carbon black. After a stirring time of 3 minutes, the colored medium was applied by a film applicator (hand coater) on white art printing cardboard. To test the stability to flocculation the film was subjected, after a short drying period, to a rub-out-test.

The following examples illustrate the invention, the parts being by weight unless otherwise stated.

EXAMPLE 1

570 parts of iron oxide red were introduced in portions into a mixture of 150 parts of oleic acid,
150 parts of an adduct of 15 mols of ethylene oxide on 1 mol of coconut fatty amine,
128 parts of ethylene glycol and
2 parts of sodium pentachlorophenolate and the whole was stirred with a saw tooth stirrer until the particles had a size of less than 2 microns.

The pigment dispersion obtained in this manner could be readily distributed without any specks in the media to be tested, the paints obtained were intensely colored and the rub-out-test gave excellent results.

When the oleic acid was replaced by the same amount of a condensation product of oleic acid and sarcosine, a pigment dispersion was obtained which could be dispersed still more readily in the test media C and D than the above dispersion. Equally good results were obtained by replacing the ethylene glycol by the same amount of diethylene glycol, propylene glycol, dipropylene glycol, polyethylene glycol having a molecular weight of 200, polypropylene glycol having a molecular weight of 750, or formamide.

COMPARATIVE EXAMPLE

By replacing in Example 1, 150 parts of the adduct of 15 mols of ethylene oxide on 1 mol of coconut fatty amine by 100 parts of ethylene glycol and 50 parts of morpholine, a pigment dispersion was obtained which could be difficultly distributed only in test medium D and which showed distinct flocculation phenomena.

EXAMPLE 2

570 parts of iron oxide red were introduced in portions into a mixture of 285 parts of an adduct of 10 mols of ethylene oxide on 1 mol of oleyl amine,
143 parts of a condensation product of oleic acid and sarcosine and
2 parts of sodium pentachlorophenolate and the mixture was stirred with a saw tooth stirrer until the particles had a size of less than 2 microns.

The pigment dispersion obtained in this manner had good rheological properties, it could be easily spread and was free from specks, intense colorations were obtained therewith and the stability to flocculation was excellent in all four test media.

EXAMPLE 3

In the manner described in Example 2, a pigment dispersion was prepared from 600 parts of iron oxide red
100 parts of a condensation product of oleic acid and sarcosine,
41 parts of the sodium salt of the sulfuric acid semiester of an addition product of 15 mols of ethylene oxide on 1 mol of coconut fatty alcohol,
50 parts of an addition product of 5 mols of ethylene oxide on 1 mol of oleyl amine,
100 parts of an addition product of 15 mols of ethylene oxide on 1 mol of coconut fatty amine,
98 parts of ethylene glycol,
9 parts of water and
2 parts of sodium pentachlorophenolate.

The pigment dispersion obtained was very stable to flocculation, had excellent rheological properties, could be readily spread and had a high tinctorial strength.

EXAMPLE 4

A pigment dispersion was prepared under the conditions of Example 2 from the following components:

500 parts of iron oxide yellow,
30 parts of a condensation product of oleic acid and sarcosine,
30 parts of an addition product of 8 mols of ethylene oxide on 1 mol of oleyl amine
100 parts of an addition product of 10 mols of ethylene oxide on 1 mol of oleyl alcohol,
338 parts of ethylene glycol and
2 parts of sodium pentachlorophenolate.

The pigment dispersion obtained in this manner had excellent utilitarian properties and was characterized by an unobjectionable rub-out-test in all test media.

EXAMPLE 5

A pigment dispersion was prepared under the conditions of Example 2 from the following components:

670 parts of chrome oxide green
100 parts of an addition product of 10 mols of ethylene oxide on 1 mol of oleyl amine,
50 parts of a condensation product of oleic acid and sarcosine
178 parts of formamide and
2 parts of sodium pentachlorophenolate.

The pigment dispersion obtained had excellent rheological properties and could be readily distributed in the test media whithout specks. The color intense paintings did not show any flocculation phenomenon.

A pigment dispersion having equally good properties was obtained when the formamide was replaced by the same amount of ethylene glycol.

EXAMPLE 6

570 parts of iron oxide brown were added in portions while stirring with a paddle stirrer to a mixture of 150 parts of oleic acid,
150 parts of an addition product of 8 mols of ethylene oxide on 1 mol of stearyl amine,
128 parts of ethylene glycol and
2 parts of sodium pentachlorophenolate.

This mixture was repeatedly passed through a rotor-stator mill until the particles had a size of less than 2 microns. The pigment dispersion obtained in this manner had excellent rheological properties and could be readily and rapidly distributed in all test media, intense colorations and unobjectionable rub-out-tests being obtained therewith.

COMPARATIVE EXAMPLES

When in Example 6 oleic acid was replaced by the same amount of ethylene glycol, a pigment dispersion was obtained which could not be distributed by hand in test media C and D due to strong flocculation.

When in Example 6 oleic acid was replaced by the same amount of an addition product of 8 mols of ethylene oxide on 1 mol of stearyl amine, a pigment dispersion was obtained which was moderately distributable in test medium C and poorly distributable in test medium D. The results were equally bad in the rub-out-tests.

When in Example 6 the addition of 8 mols of ethylene oxide on 1 mol of stearyl amine was replaced by the same amount of ethylene glycol, the pigment dispersion obtained did not flow and was unsuitable for application because of a decomposition into two phases.

When in Example 6 the addition product of 8 mols of ethylene oxide on 1 mol of stearyl amine was replaced by the same amount of oleic acid, a pigment dispersion having moderate rheological properties was obtained. It was much more difficultly distributable in test media A, C and D than the pigment dispersion of Example 6 and the rub-out-tests in said test media showed strong phenomena of flocculation.

EXAMPLE 7

A double through kneader was charged with 80 parts of the sodium salt of sulfuric acid semi-ester of an addition product of 5 mols of ethylene oxide on 1 mol of nonyl phenol,
90 parts of an addition product of 8 mols of ethylene oxide on 1 mol of stearyl amine,
54 parts of ethylene glycol and
80 parts of water and
300 parts of carbon black having a specific surface of 48 m²/g (according to BET) were added in portions.

After a kneading time of 1 hour, the kneaded mass was diluted with 316 parts of ethylene glycol,
78 parts of water and
2 parts of sodium pentachlorophenolate.

The pigment dispersion obtained in this manner had very good rheological properties and could be very readily distributed in test media A, B and D, and readily distributed in medium C. The flocculation stability in the rub-out-tests was good in medium C and very good in the other test media.

EXAMPLE 8

400 parts of C.I. Pigment Yellow 97 (Color Index No. 11,767)
20 parts of the sodium salt of the sulfuric acid, semi-ester of an addition product of 5 mols of ethylene oxide on 1 mol of nonyl phenol,
27 parts of the sodium salt of dodecyl benzenesulfonic acid,
40 parts of an addition product of 8 mols of ethylene oxide on 1 mol of oleyl amine,
148 parts of ethylene glycol and
33 parts of water were kneaded for 1 hour in a double through kneader. The kneaded mass was then diluted with 172 parts of water and
2 parts of sodium pentachlorophenolate.

The pigment dispersion obtained was readily flowable and could be distributed especially easily in all 4 test media. The colorations obtained with the pigment dispersion had a high color strength and showed brilliant and pure shades, which exhibited no flocculation phenomena in the rub-out-test.

EXAMPLE 9

In a double trough kneader 460 parts of C.I. Pigment Yellow 1 (Color Index No. 11,680)
20 parts of the sodium salt of the sulfuric acid semi-ester of an addition product of 5 mols of ethylene oxide on 1 mol of nonyl phenol,
20 parts of the sodium salt of dodecyl benzenesulfonic acid,
25 parts of an addition product of 8 mols of ethylene oxide on 1 mol of oleyl amine,
92 parts of ethylene glycol and
86 parts of water were made into a paste and kneaded for 1 hour. The kneaded mass was then diluted by adding
183 parts of ethylene glycol,
112 parts of water and
2 parts of sodium pentachlorophenolate.

The highly concentrated pigment dispersion having excellent rheological properties could be very readily worked into the 4 test media without specks and yielded intense, brilliant and pure colorations which did not show any flocculation phenomenon in the test media.

EXAMPLE 10

In a double trough kneader 320 parts of C.I. Pigment Red 168 (Color Index No. 59,300)
67 parts of the sodium salt of dodecyl benzenesulfonic acid
100 parts of an addition product of 8 mols of ethylene oxide on 1 mol of oleyl amine,
40 parts of ethylene glycol and
33 parts of water were made into a paste, the mass was kneaded for 1 hour and then diluted with
270 parts of ethylene glycol,
168 parts of water and
2 parts of sodium pentachlorophenolate to yield a dispersion.

The pigment dispersion obtained had excellent utilitarian properties and could be worked extremely easily into all 4 test media without any flocculation occuring. The paints exhibited a high color strength, brilliancy and the shades were pure.

EXAMPLE 11

In a double trough kneader 120 parts of 2,9-dimethylquinacridone pigment were kneaded for 1 hour with the addition of
37 parts of dodecyl benzenesulfonic acid and
79 parts of an addition product of 8 mols of ethylene oxide on 1 mol of stearyl amine and then the kneaded mass was diluted with
27 parts of dodecyl benzenesulfonic acid,
57 parts of an addition product of 8 mols of ethylene oxide on 1 mol of stearyl amine,
480 parts of ethylene glycol,
198 parts of water and
2 parts of sodium pentachlorophenolate.

The readily flowable pigment dispersion could be well distributed in test media B and C and gave good rub-out-tests. The distributability in test media A and D was still better and the rub-out-tests were very good. In all media color intense, pure and brilliant colorations were obtained.

EXAMPLE 12

In a double trough kneader 300 parts of C.I. Pigment Green 7 (Color Index No. 74,260)
25 parts of the sodium salt of the sulfuric acid semi-ester of an addition product of 5 mols of ethylene oxide on 1 mol of nonyl phenol,
28 parts of the sodium salt of a condensation product of oleic acid and methyl taurine,
50 parts of an addition product of 5 mols of ethylene oxide on 1 mol of oleyl amine,
12 parts of ethylene glycol and
67 parts of water were made into a paste and kneaded for 1 hour. The mass was then diluted by adding
368 parts of ethylene glycol,
148 parts of water and
2 parts of sodium pentachlorophenolate.

The pigment dispersion obtained in this manner had excellent rheological properties and could be stirred especially easily and without flocculation into the 4 test media. The paints made with the dispersion were characterized by a high color strength and brilliancy and pure shades.

What is claimed is:

1. A pigment dispersion consisting essentially of
   a. a pigment,
   b. an alkylene oxide addition product of a long chain amine, said long chain being an alkyl or alkenyl chain of 6 to 30 carbon atoms and said addition product containing 1 to 30 ethylene oxide units, and
   c. an anionic surfactant having at least one aliphatic radical with 3 to 40 carbon atoms.

2. A pigment dispersion as claimed in claim 1, containing additionally a preservation agent.

3. A pigment dispersion as claimed in claim 1, containing additionally an agent preventing the dispersion from drying up and optionally water.

4. A dispersion as claimed in claim 1, wherein said alkylene oxide addition product is an adduct of an alkylene oxide on a primary aliphatic amine.

5. A dispersion as claimed in claim 1, wherein said alkylene oxide addition product is an ethylene oxide addition product of oleyl amine, stearylamine, tallow fatty amine or coconut fatty amine.

6. A dispersion as claimed in claim 1, wherein said surfactant has the formula

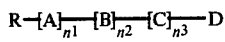

in which
R is an aliphatic radical having 3 to 40 carbon atoms,
A is benzene or naphthalene which are unsubstituted or substituted by 1 or 2 aliphatic radicals having 1 to 20 carbon atoms,
B is a bivalent group selected from —O—, —CO—, —SO$_2$—, —NR'— wherein R' is hydrogen or alkyl of 1 to 4 carbon atoms, or a combination of such bivalent groups,
C is alkylene of 1 to 6 carbon atoms or a polyalkylene oxide chain of 1 to 30 monomer units,
D is an anionic group and
$n^1$, $n^2$ and $n^3$ are zero or 1.

7. A dispersion as claimed in claim 6, wherein R has 6 to 22 carbon atoms.

8. A dispersion as claimed in claim 6, wherein R is alkyl or alkenyl which are unsubstituted or substituted by 3 equal or different substituents selected from hydroxy and carboxy.

9. A dispersion as claimed in claim 6, wherein A is benzene which is unsubstituted or substituted by 1 or 2 substituents selected from alkyl and alkenyl.

10. A dispersion as claimed in claim 6, wherein B is —O—, —CO—, —SO$_2$—, —NR'—, —CO—O—, —O—CO—, —CO—NR'—, —NR'—CO—, —SO$_2$—NR'—, or —NR'—SO$_2$—.

11. A dispersion as claimed in claim 6, wherein C is alkylene of 1 to 6 carbon atoms, or a polyalkylene oxide chain consisting of 1 to 30 ethylene oxide or propylene oxide units or both.

12. A dispersion as claimed in claim 6, wherein D is —COO$^-$, —SO$_3^-$ or —O—SO$_3^-$.

13. A dispersion as claimed in claim 1 wherein, in addition to the amine addition product and anionic surfactant, a non-ionic surfactant is used which is an alkoxylated alkylphenol or an alkoxylated fatty alcohol.

14. A process for pigmenting hydrophilic and hydrophobic media which comprises incorporating in these media a pigment dispersion as claimed in claim 1.

15. A pigment disperstion consisting essentially of
   a. from 3% to 70% by weight of a pigment,
   b. from 1% to 50% by weight of an alkylene oxide addition product of a long chain amine, said long chain being an alkyl or alkenyl chain of 6 to 30 carbon atoms and said addition product containing 1 to 30 ethylene oxide units, and
   c. from 1% to 50% by weight of an anionic surfactant having at least one aliphatic radical with 3 to 40 carbon atoms.

16. A pigment dispersion containing
   a. from 3% to 70% by weight of a pigment,
   b. from 1% to 50% by weight of an alkylene oxide addition product of a long chain amine, said long chain being an alkyl or akenyl chain of 6 to 30 carbon atoms and said addition product containing 1 to 30 ethylene oxide units, and
   c. from 1% to 50% by weight of an anionic surfactant having at least one aliphatic radical with 3 to 40 carbon atoms, and
   d. a liquid medium selected from alkylene glycols and formamide.

* * * * *